United States Patent
Oide et al.

(10) Patent No.: US 12,503,216 B2
(45) Date of Patent: Dec. 23, 2025

(54) ELECTRIC AIRCRAFT

(71) Applicant: SUBARU CORPORATION, Tokyo (JP)

(72) Inventors: Ayako Oide, Tokyo (JP); Yuki Matsui, Tokyo (JP); Daisuke Hirabayashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/377,713

(22) Filed: Oct. 6, 2023

(65) Prior Publication Data

US 2024/0150012 A1 May 9, 2024

(30) Foreign Application Priority Data

Nov. 7, 2022 (JP) .................................. 2022-178242

(51) Int. Cl.
*B64C 1/40* (2006.01)
*B64D 27/34* (2024.01)
(Continued)

(52) U.S. Cl.
CPC .............. *B64C 1/406* (2013.01); *B64D 27/34* (2024.01); *B64U 20/80* (2023.01); *B64U 30/20* (2023.01);
(Continued)

(58) Field of Classification Search
CPC .... B64D 27/34; B64D 27/357; B64D 35/021; B64D 2221/00; B64U 20/80; B64U 20/83;
(Continued)

(56) References Cited

U.S. PATENT DOCUMENTS 10,368,401 B2 * 7/2019 Wen ........................ B64D 45/00
2018/0281947 A1 10/2018 Sakai et al.
(Continued)

FOREIGN PATENT DOCUMENTS

| DE | 102015213271 A1 | 1/2017 |
|---|---|---|
| JP | 2016-222031 A | 12/2016 |
| JP | 2021-066330 A | 4/2021 |

OTHER PUBLICATIONS

Extended European Search Report, dated Mar. 1, 2024 in European Application No. 23207800.6 (in English).
(Continued)

*Primary Examiner* — Timothy D Collins
*Assistant Examiner* — Eric Acosta
(74) *Attorney, Agent, or Firm* — MCGINN I.P. LAW GROUP, PLLC (57) ABSTRACT

An electric aircraft includes a fuselage, at least one rotor, at least one coupling structure, at least one electric motor, a battery and wirings. The at least one coupling structure couples the at least one rotor to the fuselage. The at least one electric motor is for rotating the at least one rotor. The battery is attached to the fuselage. The battery is for supplying current to the at least one electric motor. The wirings electrically couples the battery to the at least one electric motor. At least a part of the wirings includes rigid conductors. At least a part of the at least one coupling structure includes the rigid conductors. At least a part of a load on the fuselage from the at least one rotor is received with the rigid conductors.

14 Claims, 7 Drawing Sheets

(51) Int. Cl.
| | |
|---|---|
| *B64U 20/80* | (2023.01) |
| *B64U 30/20* | (2023.01) |
| *H01R 4/34* | (2006.01) |
| *H02G 3/30* | (2006.01) |

(52) U.S. Cl.
CPC .............. *H01R 4/34* (2013.01); *H02G 3/305* (2013.01); *B64D 2221/00* (2013.01)

(58) Field of Classification Search
CPC . B64U 30/29; H02G 3/02; H02G 3/24; H02G 3/305; H02G 15/007; H01R 4/34
See application file for complete search history.

(56) References Cited

U.S. PATENT DOCUMENTS

2019/0061901 A1\* 2/2019 Long .......................... B64C 3/20
2019/0108928 A1 4/2019 Fernandez

OTHER PUBLICATIONS

Extended European Search Report dated Jul. 22, 2025 in European Patent Application No. 23 207 800.6-1009.

\* cited by examiner

ELECTRIC AIRCRAFT

CROSS REFERENCES TO RELATED APPLICATIONS

This application is based upon and claims the benefit of priority from Japanese Patent Application No. 2022-178242, filed on Nov. 7, 2022; the entire contents of which are incorporated herein by reference.

FIELD

Implementations described herein relate generally to an electric aircraft.

BACKGROUND

An electric aircraft typified by an eVTOL (electric vertical take-off and landing aircraft) or an eSTOL (electric short take-off and landing aircraft) is known as a kind of an aircraft (for example, refer to Japanese Patent Application Publication JP 2016-222031 A and Japanese Patent Application Publication JP 2021-066330 A).

Examples of a rotorcraft classified as an eVTOL include an electric helicopter and an electric multicopter. A helicopter is a rotorcraft having a main rotor and a tail rotor whereas a multicopter is a rotorcraft having three or more rotors, such as a quadcopter having four rotors or a hexacopter having six rotors. In recent years, a UAV (unmanned aerial vehicle), such as a helicopter or a multicopter, is sometimes called a drone whereas a manned aircraft consisting of a multicopter is sometimes called a flying car.

An electric rotorcraft, such as a helicopter or a multicopter, has electric motors for rotating rotors respectively, and a battery for supplying electric power to each of the electric motors. In a typical rotorcraft, a common battery disposed in a fuselage powers each of electric motors disposed below rotors.

However, when a large current is supplied from a battery to each electric motor, it is necessary to lay wirings, each having a large cross-sectional area, from a fuselage of an electric aircraft toward each electric motor. This leads to an increase in the weight of the electric aircraft.

Accordingly, an object of the present invention is to reduce the weight of an electric aircraft, such as an eVTOL.

SUMMARY

In general, according to one implementation, an electric aircraft includes a fuselage, at least one rotor, at least one coupling structure, at least one electric motor, a battery and wirings. The at least one coupling structure couples the at least one rotor to the fuselage. The at least one electric motor is for rotating the at least one rotor. The battery is attached to the fuselage. The battery is for supplying current to the at least one electric motor. The wirings electrically couples the battery to the at least one electric motor. At least a part of the wirings includes rigid conductors. At least a part of the at least one coupling structure includes the rigid conductors. At least a part of a load on the fuselage from the at least one rotor is received with the rigid conductors.

DETAILED DESCRIPTION

An electric aircraft according to implementations of the present invention will be described with reference to the accompanying drawings.
(First Implementation)
(Structure and Function)

Figure 1:
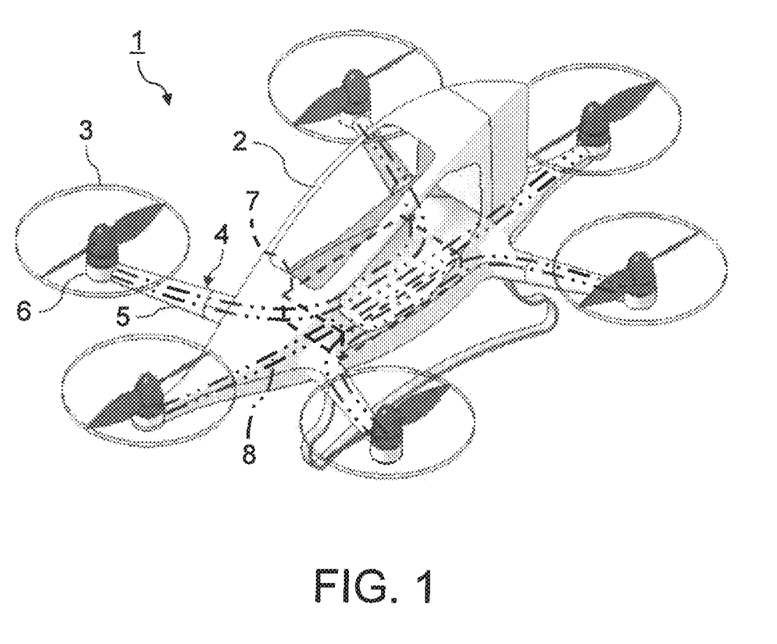
FIG. 1 is a perspective view showing an example of a structure of an electric aircraft according to the first implementation of the present invention.

FIG. 1 is a perspective view showing an example of a structure of an electric aircraft 1 according to the first implementation of the present invention.

The electric aircraft 1 is a rotorcraft including a fuselage 2 and at least one rotor 3 coupled to the fuselage 2. The rotor 3 may be called a fan or a propeller. Although FIG. 1 illustrates a hexacopter having the six rotors 3, the electric aircraft 1 may have a desired number of the rotors 3.

Therefore, the electric aircraft 1 is not limited to a multicopter and may be an electric helicopter. Although a typical helicopter has a main rotor and a tail rotor, a helicopter having no tail rotor, such as a contra-rotating helicopter, and a helicopter, having a single rotor 3, whose tail rotor is omitted by forming air outlets are also known. Therefore, the electric aircraft 1 has the at least one rotor 3. Hereinafter, the electric aircraft 1 having the rotors 3 will be described as an example with reference to FIG. 1.

The electric aircraft 1 may be a UAV, also called a drone, a manned aircraft, also called a flying car, or an OPV (Optionally Piloted Vehicle). An OPV is an unmanned aerial vehicle that can also be operated by a pilot, i.e., a hybrid aircraft between a manned aircraft and an unmanned aerial vehicle. The electric aircraft 1 can perform vertical takeoff and landing, thrust generation, and attitude control by controlling the rotation speeds of the rotors 3 and/or the pitch angles of the blades. Therefore, the electric aircraft 1 can be classified as an eVTOL.

Each rotor 3 is coupled to the fuselage 2 with a coupling structure 4. Although each coupling structure 4 is composed of a pipe-shaped arm 5 supporting the corresponding rotor 3 in the example shown in FIG. 1, each coupling structure 4 may not be clearly separated for each rotor 3. As a specific example, the arms 5 may be coupled and reinforced by ribs, and/or the arms 5 may be covered with at least one cowl plate.

Since each rotor 3 is of an electric type, electric motors 6 for rotating the rotors 3 are disposed below the rotors 3 respectively. The output shaft of the electric motor 6 is generally integrated with the rotating shaft of the rotor 3. That is, the electric motor 6 is fixed to the rotor 3 so that the rotation axis of the output shaft of the electric motor 6 and the rotation axis of the rotation shaft of the rotor 3 may be on the same straight line. Thereby, the rotors 3 can be rotated by driving the electric motors 6 respectively.

A battery 7 that supplies current to the electric motors 6 is attached to the fuselage 2. The battery 7 is electrically coupled to the electric motors 6 with wirings 8. Accordingly, the wirings 8 are laid along the arms 5 that support the rotors 3 and the electric motors 6. When the arms 5 are hollow, the wirings 8 can be disposed inside the arms 5. On the other hand, the battery 7 has terminals whose number corresponds to the numbers of the rotors 3 and the wirings 8. As a matter of course, a plurality of the batteries 7 may be mounted on the fuselage 2 according to the numbers of the rotors 3 and the wirings 8.

When a DC (direct current) motor is used as the electric motor 6, the electric motor 6 can be easily made less expensive and more compact than an AC (alternating current) motor. In addition, a DC motor is suitable for speed control since the rotation characteristics of the DC motor are stable with respect to voltage. Therefore, when a DC motor is used as each electric motor 6, the number of the wirings 8 is two (positive and negative) per one electric motor 6 as illustrated in FIG. 1.

Note that, two or more of the electric motors 6 may be coupled in parallel to the battery 7 instead of individually coupling the electric motors 6 to the battery 7. In the example shown in FIG. 1, a pair of the front and rear electric motors 6 disposed on the right side of the fuselage 2 are coupled in parallel to the battery 7. Similarly, a pair of the front and rear electric motors 6 disposed on the left side of the fuselage 2 are coupled in parallel to the battery 7 while a pair of the front and rear electric motors 6 disposed in the center of the fuselage 2 are coupled in parallel to the battery 7.

In this case, the number of the wirings 8 coupled to the six electric motors 6 is six when the positive and negative are separately counted. Therefore, it is sufficient to provide six terminals on the battery 7 or the batteries 7, and electrically couple the terminals to the wirings 8 respectively.

Figure 2:
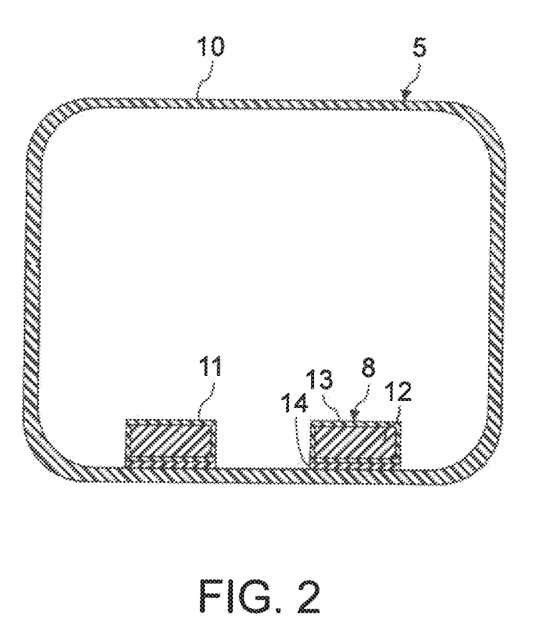
FIG. 2 is a cross sectional view showing an example of a structure of the arm including the wirings shown in FIG. 1.

FIG. 2 is a cross sectional view showing an example of a structure of the arm 5 including the wirings 8 shown in FIG. 1.

The arm 5 included in the coupling structure 4 that couples the rotor 3 to the fuselage 2 can be composed of a panel 10 and reinforcing members 11 for reinforcing the panel 10. The panel 10 has a hollow rod-shape whose cross section is a rounded rectangle, i.e., a square having round-chamfered corners, or the like as illustrated in FIG. 2. As described above, the coupling structure 4 may have at least one structural member other than the arm 5. Accordingly, the coupling structure 4 can have a structure at least partially including the panel 10 and the reinforcing members 11 for reinforcing the panel 10.

Each reinforcing member 11 is a rod-shaped member, having an elongated structure, whose length direction is the length direction of the arm 5. Each reinforcing member 11 having the elongated structure is called a stringer, a spar, a frame or a rib according to its shape and position. Each reinforcing member 11 from the fuselage 2 towards an end portion of the fuselage 2 is often called a stringer.

Although each reinforcing member 11, such as a stringer, having a hollow structure and reinforcing the panel 10 is generally fixed inside the panel 10 so as not to be exposed to the outside as shown in FIG. 2, each reinforcing member 11 may be fixed outside the panel 10. That is, the reinforcing members 11 may be attached outside the arm 5 although the reinforcing members 11 are disposed inside the arm 5 in the example shown in FIG. 2.

The panel 10 included in the arm 5 can be made of an FRP (fiber reinforced plastic), such as a CFRP (carbon fiber reinforced plastic). An FRP, also called a composite material, has higher specific strength and specific rigidity than those of a metal. Therefore, using an FRP allows reducing the weight of the electric aircraft 1.

On the other hand, each of the reinforcing members 11 included in the arm 5 can be made of a rigid conductor 12 forming a part of the wiring 8 for supplying current from the battery 7 to the electric motor 6. That is, an electric current can be passed through the reinforcing member 11 for receiving a load.

For that purpose, the cross sectional area of the rigid conductor 12, which also serves as the reinforcing member 11, is determined to be a cross sectional area necessary for receiving the load as well as necessary for passing the current. Meanwhile, the cross sectional shape of the rigid conductor 12, which also serves as the reinforcing member 11, may be not only a quadrangle as illustrated in FIG. 2, but also a desired shape, such as a hat shape, an I-shape, an inverted T-shape, or a twisted blade shape, in order to secure the strength.

One of suitable materials for the rigid conductor 12 which also serves as the reinforcing member 11 is aluminum. This is because aluminum is a good conductor and has a high specific strength. Alternatively, copper may be used as a material for the rigid conductor 12 which also serves as the reinforcing member 11. Using copper allows reducing the cross sectional area since copper has lower electrical resistance and higher strength than those of aluminum. More specifically, when the rigid conductor 12 that also serves as the reinforcing member 11 is made of copper, what is necessary is to ensure a cross sectional area necessary to receive the load since the rigid conductor 12 can pass a required current as long as the rigid conductor 12 has a cross sectional area not less than that of a conventional copper wire in principle.

Therefore, copper may be used when the rigid conductor 12 which also serves as the reinforcing member 11 is disposed in a narrow space where there may be interference, or the like. Conversely, when there is no restriction on a space for placing the rigid conductor 12 that also serves as the reinforcing member 11, using aluminum having a low specific gravity instead of using copper having a higher specific gravity than that of iron leads to weight reduction of the electric aircraft 1. Accordingly, the reinforcing members 11 can be made of at least aluminum, and copper can be used locally, as necessary.

When the reinforcing member 11 is made of the rigid conductor 12, it is necessary to insulate the rigid conductor 12. Accordingly, each of the rigid conductors 12 that double as the reinforcing members 11 can be covered with an insulating material 13. Therefore, each rigid conductor 12 is bonded to the panel 10 in a state where each rigid conductor 12 is covered with the insulating material 13.

When an insulating FRP represented by GFRP (glass fiber reinforced plastic) is used as the insulating material 13, adhesion of the insulating material 13 to the panel 10 is facilitated as described later. Here, a case where GFRP is used as the insulating FRP will be described as an example although examples of the insulating FRP also include AFRP (aramid fiber reinforced plastic), also known as Kevlar (registered trademark), and NFRP (natural fiber reinforced plastic). AFRP is resin reinforced by aramid fibers. NFRP is resin reinforced by natural fibers.

More specifically, the reinforcing member 11 that also serves as the rigid conductor 12 can be covered with the insulating material 13 made of GFRP by laminating the GFRP on the rigid conductor 12 and then curing the GFRP. Note that, the GFRP does not function as a structural member, but functions as the insulating material 13 since the load is applied to the rigid conductor 12 which also serves as the reinforcing member 11 even when the reinforcing member 11 is covered with the GFRP.

It is appropriate to adhere the GFRP covering the reinforcing member 11 to the CFRP forming the panel 10 at room temperature secondarily after molding, instead of integral molding. More specifically, the pipe-shaped CFRP forming the panel 10 can be produced by molding or intermediate curing of divided CFRP pieces, and subsequent assembling of the CFRP pieces by bonding them with an adhesive, re-curing or the like. Alternatively, the pipe-shaped CFRP forming the panel 10 can also be produced by integrally molding the CFRP with a core, such as a bladder bag, which can be pulled out after molding the CFRP, inserted into the hollow portion of the CFRP. On the other hand, it is appropriate to bond each reinforcing member 11 coated with the insulating material 13 made of the GFRP to the panel 10 made of the CFRP with an adhesive 14 without integrally molding the GFRP with the CFRP.

This is because there is a non-negligible difference in thermal expansion between the reinforcing member 11 and an FRP. Specifically, a coefficient of thermal expansion of a metal, such as aluminum or copper, is much larger than that of an FRP, such as CFRP. For this reason, if the GFRP coating aluminum and the CFRP are integrally molded by heating them up to about 130° C. to 180° C., which is molding temperature of an FRP, the difference in thermal expansion causes problems, such as warping of aluminum, and cracking and peeling in a bonded portion of the GFRP and the CFRP.

The matrices (base materials) of GFRP and CFRP are known resins represented by epoxy resin. Therefore, when GFRP is used as the insulating material 13, each reinforcing member 11 can be easily and stably adhered to the panel 10 at room temperature with the appropriate known adhesive 14, such as an epoxy resin-based adhesive or a urethane resin-based adhesive, according to kinds of the resins for bonding the FRPs to each other. That is, when GFRP is used as the insulating material 13, it is possible to reliably prevent the insulating material 13 from peeling off the rigid conductor 12 and the reinforcing member 11 from peeling off from the panel 10.

Examples of the insulating material 13 include not only the above-mentioned GFRP, but also an insulating tube similar to an insulating tube for covering a copper wire, and known insulating paint. In case of using an insulating tube, the rigid conductor 12 is covered with the insulating tube. On the other hand, in case of using insulating paint, the rigid conductor 12 is coated with the insulating paint.

It is appropriate to adhere the insulating tube, covering the reinforcing member 11 made of the rigid conductor 12, with an adhesive so as not to come off unlike an insulating tube that covers a copper wire. It is necessary to adhere the reinforcing member 11 covered with an insulating tube or the reinforcing member 11 covered with insulating paint to the panel 10 with the adhesive 14. Therefore, it is appropriate to select the appropriate adhesive 14 according to a material of the insulating tube or the insulating paint.

Although it is appropriate to cover the rigid conductor 12 with the insulating material 13, each electrical contact requires the rigid conductor 12 to be exposed without the cover with the insulating material 13. Specifically, it is necessary to electrically couple the rigid conductor 12 to copper wires or the like at a coupling portion with the electric motor 6 and a coupling portion with the battery 7 out of the rigid conductor 12.

Figure 3:
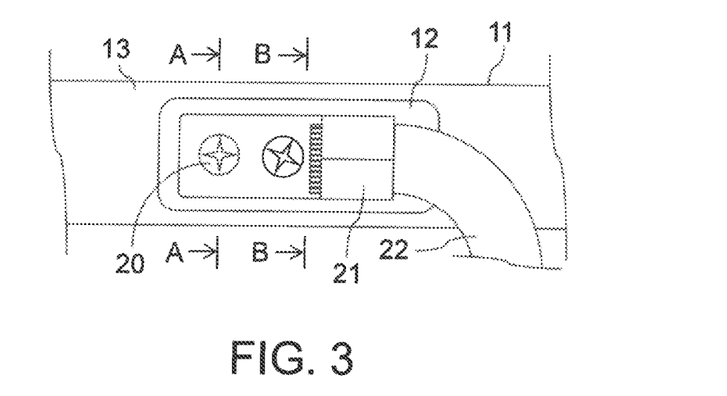
FIG. 3 is a top view showing an example of a structure of a contact point of the rigid conductor shown in FIG. 2.
Figure 4:
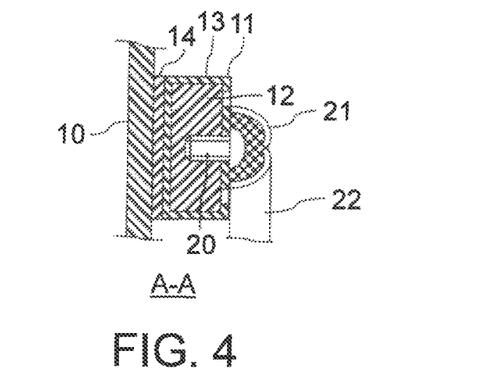
FIG. 4 is a cross sectional view at the position A-A of the rigid conductor shown in FIG. 3.
Figure 5:
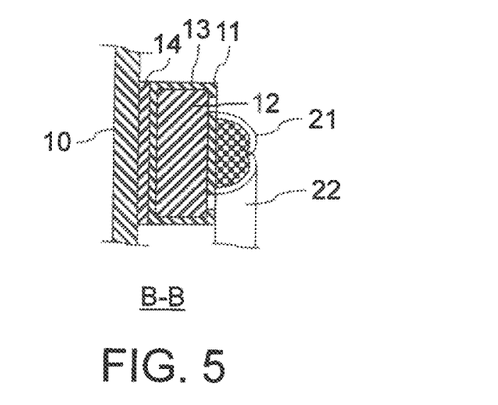
FIG. 5 is a cross sectional view at the position B-B of the rigid conductor shown in FIG. 3.

FIG. 3 is a top view showing an example of a structure of a contact point of the rigid conductor 12 shown in FIG. 2. FIG. 4 is a cross sectional view at the position A-A of the rigid conductor 12 shown in FIG. 3. FIG. 5 is a cross sectional view at the position B-B of the rigid conductor 12 shown in FIG. 3.

As shown in FIG. 3 to FIG. 5, the insulating material 13 may be removed to locally expose the rigid conductor 12 at each coupling portion of the rigid conductor 12. The exposed portion of the rigid conductor 12 may be internally threaded by pre-drilling and tapping to pre-drilled holes. Thereby, a wire retainer 21 can be fixed to the rigid conductor 12 with typical bolts 20 as illustrated, stud bolts, or the like. Then, one end portion of an electric wire 22, such as a copper wire, coupled to a terminal of the electric motor 6 or the battery 7 can be sandwiched and fixed by the wire retainer 21.

In the electric aircraft 1 as described above, at least a part of the wirings 8 for supplying current from the battery 7 to the electric motors 6 is formed with the rigid conductors 12 included in the coupling structures 4 which couple the rotors 3 to the fuselage 2 while the rigid conductors 12 receive at least a part of a load applied from at least one of the rotors 3 to the fuselage 2.

(Effects)

Therefore, according to the electric aircraft 1, it is possible to eliminate the need for copper wires that has conventionally been required to be laid separately from the coupling structures 4. As a result, the weight of the electric aircraft 1 can be reduced. In addition, it is possible to reduce labor required for assembling the electric aircraft 1 since it is also possible to eliminate the need for copper wire laying operations including passing copper wires through the coupling structures 4 and fixing copper wires to the coupling structures 4.

Further, each of the reinforcing members 11 has a cross sectional area for ensuring strength, and the cross sectional area of each reinforcing member 11 can also be effectively utilized as a cross sectional area for flowing current. That is, it is possible to easily secure such a cross sectional area for a flow of current that can reduce electrical resistance.

Figure 6:
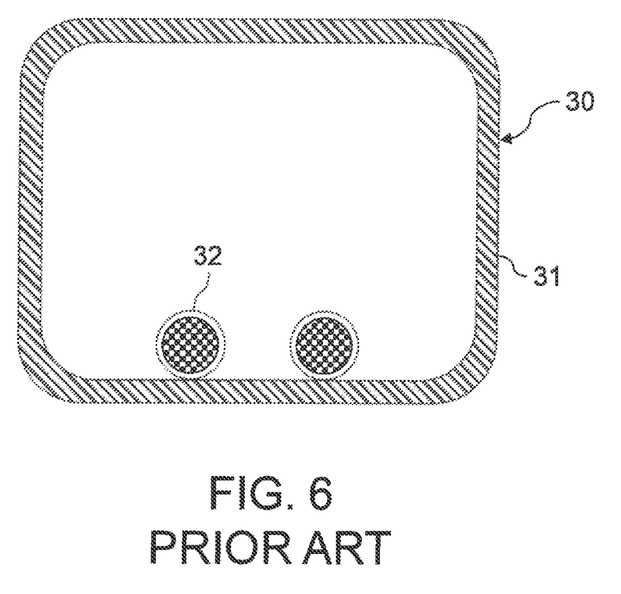
FIG. 6 is a cross sectional view of a conventional arm having a simple panel structure.

FIG. 6 is a cross sectional view of a conventional arm 30 having a simple panel structure.

The simplest structure of the conventional arm 30 is a structure consisting of only a panel 31 without stringers as shown in FIG. 6. In this case, the arm 30 has a pipe-like structure without unevenness, and copper wires 32 are disposed inside the arm 30. When the conventional arm 30 is also made of CFRP, the weight of the arm 30 can be reduced compared to a case where the arm 30 is made of a metal, such as aluminum.

On the other hand, in case of the panel 10 reinforced with the reinforcing members 11 as shown in FIG. 2, not only the panel 10 but also the reinforcing members 11 can receive a load. Therefore, the cross sectional area of the panel 10 can be made smaller than the cross sectional area of the conventional arm 30 consisting of only the panel 31 as long as the same material is used. Therefore, when each of the reinforcing members 11 is made of an aluminum rod having a high specific strength, the weight of the arm 5 in which the reinforcing members 11 are attached to the panel 10 can be reduced compared to that of the conventional arm 30 since the arm 5 does not require the copper wires 32 each having a higher specific gravity than that of aluminum.

Alternatively, when the cross sectional area of the panel 10 reinforced by the reinforcing members 11 is made equal to the cross sectional area of the conventional panel 31, it becomes possible to support the electric motor 6 with a larger output since the reinforcing members 11 can also receive a load. As a result, lift generated by the rotors 3 can be increased.

Figure 7:
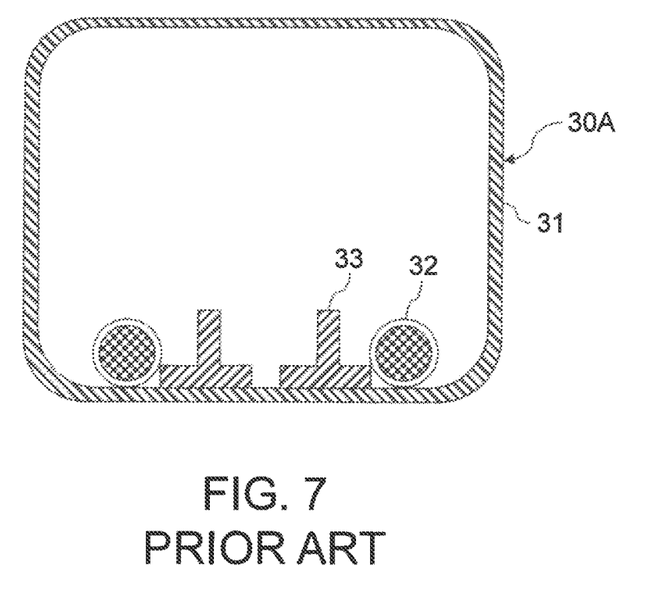
FIG. 7 is a cross sectional view of a conventional arm in which a panel is reinforced with stringers.

FIG. 7 is a cross sectional view of a conventional arm 30A in which a panel 31 is reinforced with stringers 33.

As shown in FIG. 7, the conventional arm 30A having the structure in which the panel 31 is reinforced with the stringers 33 is also known. In this case also, when the stringers 33 and the panel 31 are made of CFRP, the weight can be reduced compared to a case where the stringers 33 and the panel 31 are made of a metal, such as aluminum. The copper wires 32 are also disposed inside the conventional arm 30A in which the panel 31 is reinforced with the stringers 33.

On the other hand, when each of the reinforcing members 11 is the rigid conductor 12 made of aluminum as shown in FIG. 2, the weight of the arm 5 can be reduced compared to that of the conventional arm 30A in which the panel 31 is reinforced with the stringers 33 even in a case where the weight of the reinforcing members 11 made of aluminum becomes larger than the weight of the conventional stringers 33 made of CFRP since the arm 5 does not require the copper wires 32 each having a high specific gravity.

Note that, when the cross sectional area of the stringer 33 attached to the conventional arm 30A is smaller than a cross sectional area required for a current flow, not only the reinforcing member 11 having a cross sectional area larger than the cross sectional area of the stringer 33 attached to the conventional arm 30 can be attached to the panel 10, but also the reinforcing members 11 more than the stringers 33 attached to the conventional arms 30 may be attached to the panel 10.

Whereas the conventional arm 30A in which the panel 31 is reinforced with the stringers 33 can be integrally molded by making both the panel 31 and the stringers 33 of CFRP, the arm 5 in which the rigid conductors 12 are attached to the panel 10 is produced by separately molding the panel 10 made of CFRP and each rigid conductor 12 insulated and covered with GFRP, and subsequently bonding each rigid conductor 12 to the panel 10 with the adhesive 14 since a difference in thermal expansion coefficient between each rigid conductor 12 and the panel 10 is large as described above.

(Second Implementation)

Figure 8:
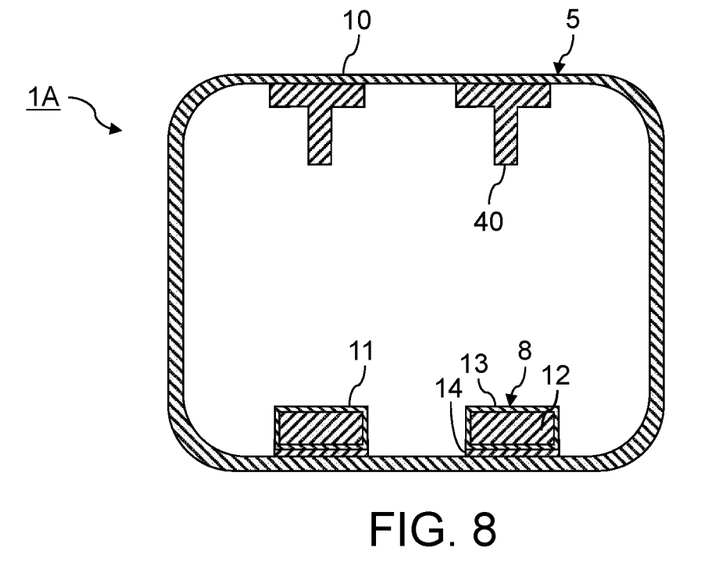
FIG. 8 is a cross sectional view showing an example of a structure of an arm included in an electric aircraft according to the second implementation of the present invention.

FIG. 8 is a cross sectional view showing an example of a structure of an arm 5 included in an electric aircraft 1A according to the second implementation of the present invention.

The electric aircraft 1A according to the second implementation shown in FIG. 8 differs from the electric aircraft 1 according to the first implementation in structures of the arms 5 that couple the rotors 3 to the fuselage 2 respectively. Other configurations and actions of the electric aircraft 1A in the second implementation are not substantially different from those of the electric aircraft 1 in the first implementation. Therefore, only a cross section showing an example of a structure of the arm 5 is illustrated, and the same elements and the corresponding elements are denoted by the same reference signs while descriptions thereof are omitted.

When the cross sectional areas of the reinforcing members 11 made of the rigid conductors 12 are sufficient for current to flow, but are insufficient for ensuring strength, the panel 10 may be reinforced by both at least one reinforcing member 40 made of CFRP and the reinforcing members 11 made of the rigid conductors 12 as shown in FIG. 8. Thereby, the weight of the arm 5 can be reduced compared to that in a case where the strength of the arm 5 is ensured only by the reinforcing members 11 made of the rigid conductors 12.

(Third Implementation)

Figure 9:
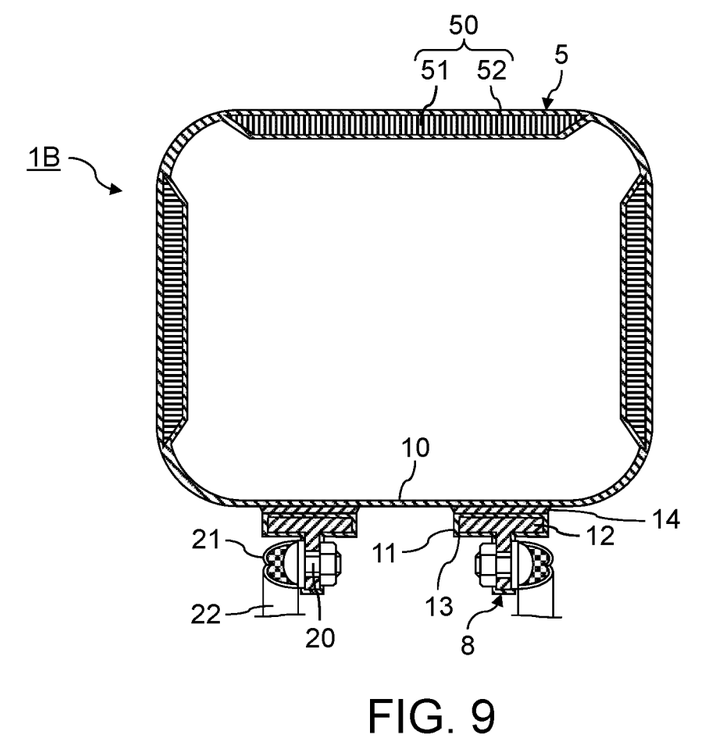
FIG. 9 is a cross sectional view showing an example of a structure of an arm included in an electric aircraft according to the third implementation of the present invention.

FIG. 9 is a cross sectional view showing an example of a structure of an arm 5 included in an electric aircraft 1B according to the third implementation of the present invention.

The electric aircraft 1B according to the third implementation shown in FIG. 9 differs from the electric aircraft 1 according to the first implementation in structures of the arms 5 that couple the rotors 3 to the fuselage 2 respectively. Other configurations and actions of the electric aircraft 1B in the third implementation are not substantially different from those of the electric aircraft 1 in the first implementation. Therefore, only a cross section showing an example of a structure of the arm 5 is illustrated, and the same elements and the corresponding elements are denoted by the same reference signs while descriptions thereof are omitted.

As shown in FIG. 9, the panel 10 may be partially made of at least one honeycomb sandwich structure 50 without being reinforced with the reinforcing members 11. That is, at least one portion of the arm 5 may be formed by the panel 10 reinforced by the reinforcing members 11 made of the rigid conductors 12 while at least one other portion of the arm 5 may be made of the honeycomb sandwich structure 50.

The length direction of each reinforcing member 11 that reinforces the panel 10 is the length direction of the arm 5. Therefore, the arm 5 has at least one portion formed by the panel 10 reinforced with the reinforcing members 11 and at least one portion made of the honeycomb sandwich structure 50, in a cross section of the arm 5 as shown in FIG. 9. In other words, in the circumferential direction of the arm 5, the arm 5 is partially made of the honeycomb sandwich structure 50 or the honeycomb sandwich structures 50 while the arm 5 is also partially made of the panel 10 or the panels 10 reinforced with the reinforcing members 11.

The honeycomb sandwich structure 50 is a structure in which a core material having a honeycomb structure, i.e., a honeycomb core 51 is sandwiched between two panels 52. The honeycomb core 51 is typically made of aluminum, an FRP, such as CFRP or GFRP, Nomex (registered trademark) which is aramid paper impregnated with resin, or the like. On the other hand, the panels 52 sandwiching the honeycomb core 51 are made of aluminum, CFRP, or the like.

Note that, each of R-chamfered portions whose curvatures are large in a cross section of the arm 5 may be formed only by a panel made of CFRP, aluminum, or the like without disposing the honeycomb core 51 as illustrated in FIG. 9 although the honeycomb core 51 can be bent to some extent when the curvature is small.

As described in the first implementation, the reinforcing members 11 consisting of the rigid conductors 12 covered with the insulating materials 13 may be fixed to the outside of the arm 5. In the example shown in FIG. 9, the reinforcing members 11 each having a T-shaped cross section are fixed to the outside of the arm 5. In this case, a portion of the flange of the reinforcing member 11 can be exposed without being covered with the insulating material 13, and the exposed portion can be used as an electrical contact by fixing the wire retainer 21 with the typical bolts 20, stud bolts, or the like.

Disposing the reinforcing members 11 outside the arm 5 in this way facilitates not only bonding the reinforcing members 11 to the panel 10, but also operations for coupling the electric wires 22 to the contacts of the rigid conductors 12 which also serve as the reinforcing members 11. When the reinforcing members 11 are fixed to the outside of the arm 5, the reinforcing members 11 may be covered with a fairing (cowl) or coupled to another structure so as not to be exposed on the atmosphere side.

Figure 10:
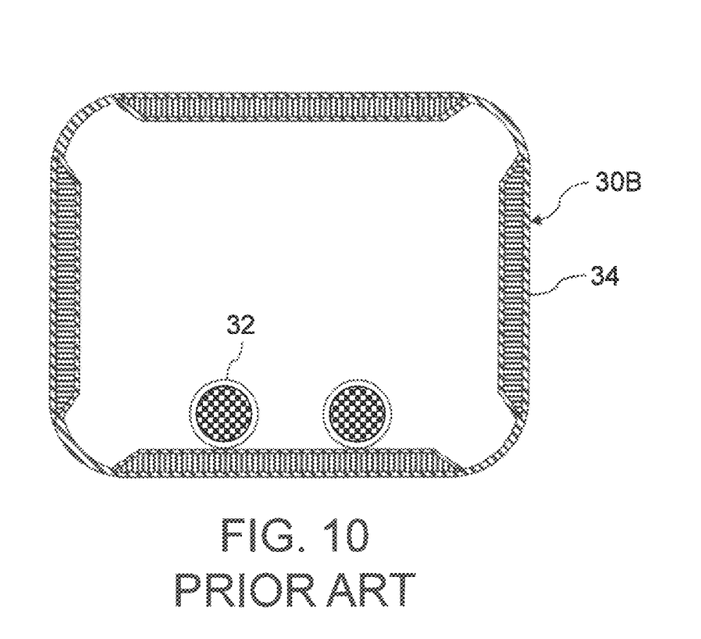
FIG. 10 is a cross sectional view of a conventional arm having honeycomb sandwich structures.

FIG. 10 is a cross sectional view of a conventional arm 30B having honeycomb sandwich structures 34.

The conventional arm 30B having the honeycomb sandwich structures 34 is hollow pipe-like, and the copper wires 32 are disposed inside the arm 30B. In case of a small aircraft, such as an eVTOL, the arm 30 having the single panel structure shown in FIG. 6 or the arm 30B having the honeycomb sandwich structures 34 shown in FIG. 10 is often adopted.

On the other hand, when a part of the arm 5 having the honeycomb sandwich structures 50 is formed by the panel 10 reinforced by the reinforcing members 11 made of the rigid conductors 12 as shown in FIG. 9, the weight of the arm 5 can be reduced compared to that of the conventional arm 30B having the honeycomb sandwich structures 34 since the laying of the copper wires 32 can be made unnecessary while securing the strength of the arm 5 equivalent to that of the conventional arm 30B having the honeycomb sandwich structures 34.

(Fourth Implementation)

Figure 11:
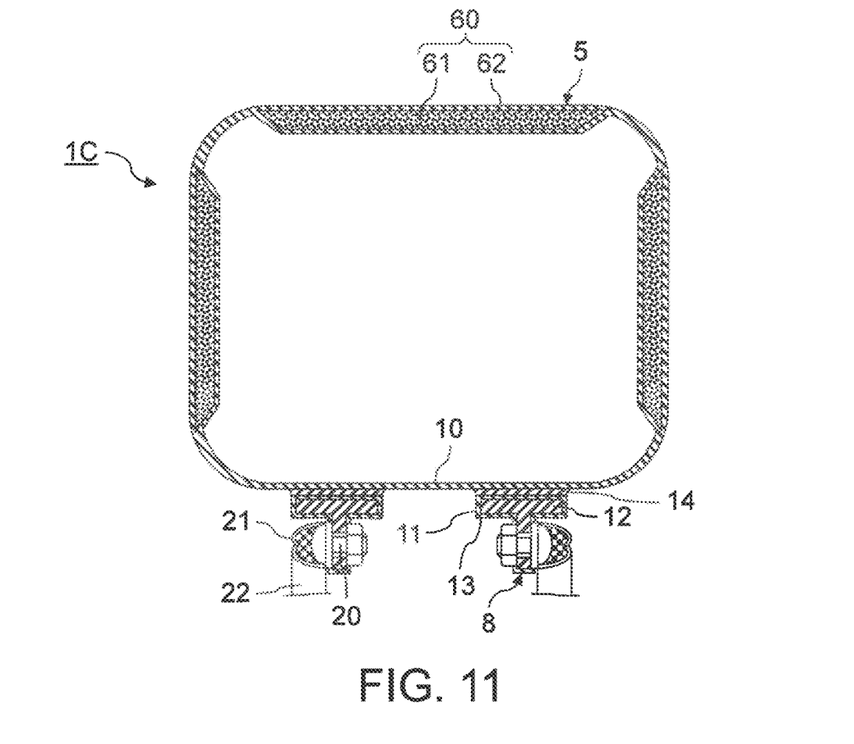
FIG. 11 is a cross sectional view showing an example of a structure of an arm included in an electric aircraft according to the fourth implementation of the present invention.

FIG. 11 is a cross sectional view showing an example of a structure of an arm 5 included in an electric aircraft 1C according to the fourth implementation of the present invention.

The electric aircraft 1C according to the fourth implementation shown in FIG. 11 differs from the electric aircraft 16 according to the third implementation in that a core material of a sandwich structure 60 is not the honeycomb core 51 but a foam core 61. Other configurations and actions of the electric aircraft 1C in the fourth implementation are not substantially different from those of the electric aircraft 16 in the third implementation. Therefore, only a cross section showing an example of a structure of the arm 5 is illustrated, and the same elements and the corresponding elements are denoted by the same reference signs while descriptions thereof are omitted.

As shown in FIG. 11, each sandwich structure 60 may also be composed of the foam core 61 and two panels 62 sandwiching the foam core 61. The foam core 61 is foam used as a core material for the sandwich structure 60. The honeycomb sandwich structure 50 illustrated in FIG. 9 and the sandwich structure 60 (foam core sandwich structure) in which the foam core 61 is sandwiched between the panels 62 illustrated in FIG. 11 are often collectively referred to as a sandwich structure. Concrete examples of a material of the foam core 61 include PMI (polymethacrylimide)-based foam. As a matter of course, foam made of another material may be used for the foam core 61.

(Fifth Implementation)

Figure 12:
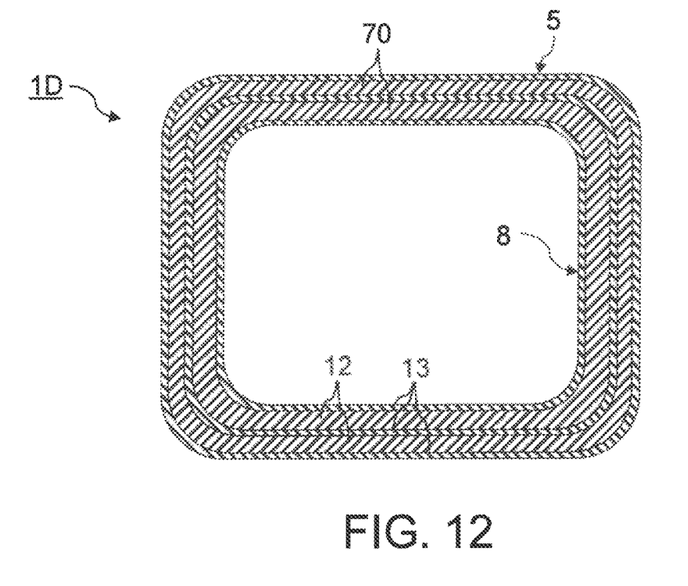
FIG. 12 is a cross sectional view showing an example of a structure of an arm included in an electric aircraft according to the fifth implementation of the present invention.

FIG. 12 is a cross sectional view showing an example of a structure of an arm 5 included in an electric aircraft 1D according to the fifth implementation of the present invention.

The electric aircraft 1D according to the fifth implementation shown in FIG. 12 differs from the electric aircraft 1 according to the first implementation in structures of the arms 5 that couple the rotors 3 to the fuselage 2 respectively. Other configurations and actions of the electric aircraft 1D in the fifth implementation are not substantially different from those of the electric aircraft 1 in the first implementation. Therefore, only a cross section showing an example of a structure of the arm 5 is illustrated, and the same elements and the corresponding elements are denoted by the same reference signs while descriptions thereof are omitted.

As shown in FIG. 12, the arm 5 may be composed of conductor panels 70 made of aluminum, and the conductor panels 70 may be used as the rigid conductors 12 for flowing currents respectively. In this case, each conductor panel 70 is coated with the insulating material 13. Since it is necessary to pass positive and negative currents, at least the two conductor panels 70 each covered with the insulating material 13, such as GFRP, are coupled to each other with coupling fittings or an adhesive. Alternatively, the GFRP covering the conductor panels 70 may be integrally molded.

In the example shown in FIG. 12, the first pipe-shaped conductor panel 70 having a small size is disposed inside the second pipe-shaped conductor panel 70 having a large size, and the cross sectional areas of the conductor panels 70 are made similar to each other by adjusting the thicknesses of the conductor panels 70. As a matter of course, the arm 5 consisting of a single pipe may be divided into a plurality of pieces, which are made of the conductor panels 70 each covered with the insulating material 13, coupled to each other with coupling fittings or an adhesive. Alternatively, the GFRP covering the conductor panels 70 may be integrally molded into a pipe shape.

As for contacts of the conductor panels 70, protruding both ends of the inner conductor panel 70 from the outer conductor panel 70 by making the length of the inner conductor panel 70 longer than the length of the outer conductor panel 70, or forming through holes in the outer conductor panel 70 allows locally exposing both the inner conductor panel 70 and the outer conductor panel 70 without being covered with insulating materials 13, in case of the two-layer example shown in FIG. 12. When the conductor panel 70 consisting of one layer is divided into pieces, each piece can be locally exposed without being covered with the insulating material 13.

At least one reinforcing member may be added, as necessary. In that case, the reinforcing member 11 or the reinforcing members 11 each made of aluminum or copper and coated with the insulating material 13 may be attached to at least one of the conductor panels 70 similarly to the first implementation shown in FIG. 2 so that not only the conductor panels 70 but also the reinforcing member 11 or the reinforcing members 11 can be used as the rigid conductors 12.

According to the fifth implementation described above, the manufacturing cost of the arm 5 can be reduced since an FRP does not necessarily have to be used. In addition, the weight of the arm 5 can also be reduced by eliminating the copper wires 32 that have been conventionally required.

(Sixth Implementation)

Figure 13:
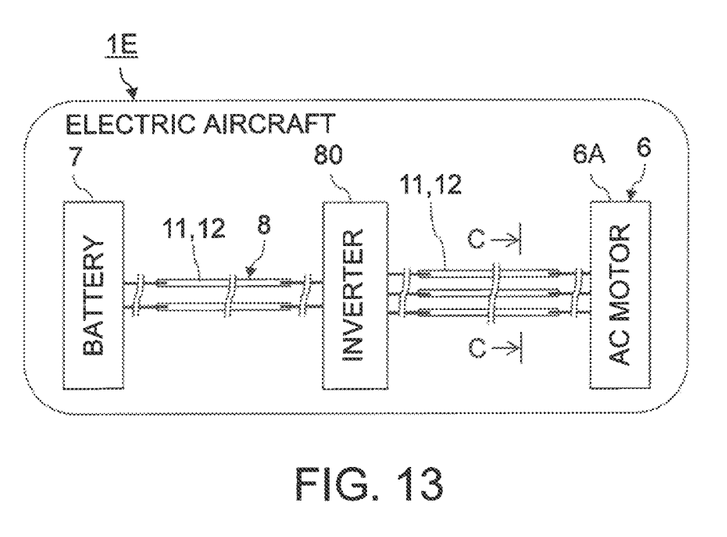
FIG. 13 shows wirings including rigid conductors attached as reinforcing members to an arm included in an electric aircraft according to the sixth implementation of the present invention.
Figure 14:
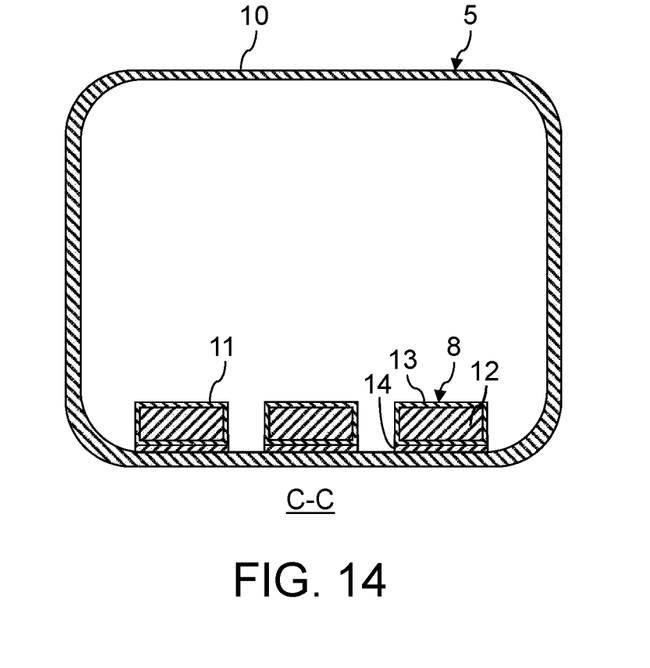
FIG. 14 is a cross sectional view of the arm including the rigid conductors at the position C-C in FIG. 13.

FIG. 13 shows wirings including rigid conductors 12 attached as reinforcing members 11 to an arm 5 included in an electric aircraft 1E according to the sixth implementation of the present invention. FIG. 14 is a cross sectional view of the arm 5 including the rigid conductors 12 at the position C-C in FIG. 13.

The electric aircraft 1E according to the sixth implementation shown in FIG. 13 and FIG. 14 differs from the electric aircraft 1 according to the first implementation in that at least one of the electric motors 6 is an AC motor 6A. Other configurations and actions of the electric aircraft 1E in the sixth implementation are not substantially different from those of the electric aircraft 1 in the first implementation. Therefore, only a wiring drawing and a cross section showing an example of a structure of the arm 5 are shown, and the same elements and the corresponding elements are denoted by the same reference signs while descriptions thereof are omitted.

Also when the electric motor 6 is the AC motor 6A, at least a part of each wiring 8 for supplying current from the battery 7 to the electric motor 6 can be made of the rigid conductor 12 that also serves as the reinforcing member 11 included in the coupling structure 4 for coupling the rotor 3 to the fuselage 2. When the AC motor 6A is used, an inverter 80 for converting a direct current into a three-phase alternating current is coupled between the battery 7 and the AC motor 6A as shown in FIG. 13 since the current output from the battery 7 is a direct current.

At least the two positive and negative wirings 8 are required in the range, in which direct current flows, from the battery 7 to the inverter 80. Therefore, when the rigid conductors 12 that also serve as the reinforcing members 11 are disposed in the range where direct current flows, it is necessary to dispose at least the two rigid conductors 12 similarly to the first implementation.

On the other hand, the three wirings 8 are required in the range, in which alternating current flows, from the inverter 80 to the AC motor 6A as shown in FIG. 13. Therefore, when the rigid conductors 12 that also serve as the reinforcing members 11 are disposed in the range where alternating current flows, it is necessary to dispose at least the three rigid conductors 12 as shown in FIG. 13 and FIG. 14.

(Seventh Implementation)

Figure 15:
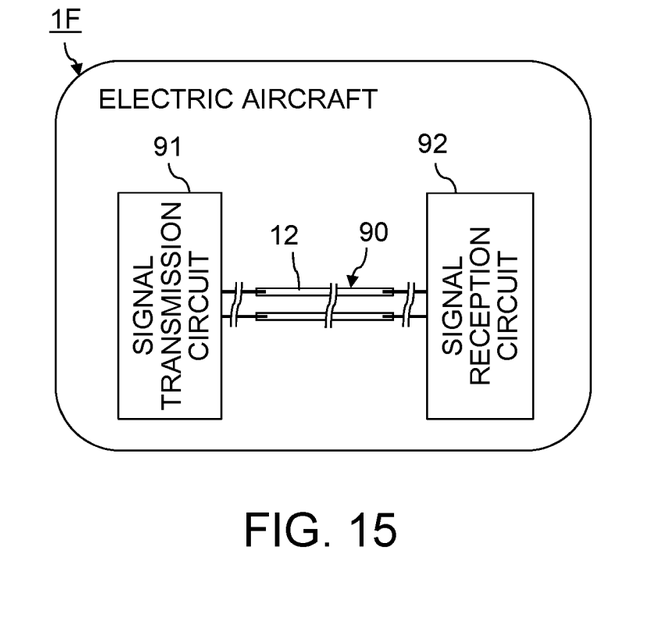
FIG. 15 shows wirings including rigid conductors included in an electric aircraft according to the seventh implementation of the present invention.

FIG. 15 shows wirings including rigid conductors 12 included in an electric aircraft 1F according to the seventh implementation of the present invention.

The electric aircraft 1F according to the seventh implementation shown in FIG. 15 differs from the electric aircraft 1 according to the first implementation in that signal lines 90 in a signal circuit are formed by the rigid conductors 12 that also serve as reinforcing members, such as stringers, which are a part of structural members. Other configurations and actions of the electric aircraft 1F in the seventh implementation are not substantially different from those of the electric aircraft 1 in the first implementation. Therefore, only a wiring drawing is shown, and the same elements and the corresponding elements are denoted by the same reference signs while descriptions thereof are omitted.

As shown in FIG. 15, parts of the signal lines 90 in a signal circuit may also be made of the rigid conductors 12 that also serve as reinforcing members, such as stringers, for receiving loads although an example in which parts of the wirings 8 in a power circuit for the purpose of power supply are made of the rigid conductors 12 has been described in each of the first to sixth implementations described above. Specifically, portions of the signal lines 90 coupling a signal transmission circuit 91 to a signal reception circuit 92 can be made of the rigid conductors 12 that receive loads, respectively.

The signal transmission circuit 91 may be not only a control circuit, which transmits control signals, like a controller of the electric motor 6, but also a sensor, such as an atmospheric pressure sensor, an optical camera, an altimeter or a GPS (Global Positioning System) sensor, which transmits measured signals or detected signals. As a matter of course, a part of a signal line 90 coupled to a signal transmission/reception circuit that transmits and receives signals may also be made of the rigid conductor 12 that receives a load. A signal transmitted by the signal lines 90 may be either a direct current or an alternating current, and the number of the rigid conductors 12 can be determined according to the number of the signal lines 90.

OTHER IMPLEMENTATIONS

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:
1. An electric aircraft comprising:
   a fuselage;
   at least one rotor;
   at least one coupling structure coupling the at least one rotor to the fuselage, the at least one coupling structure including at least one of a panel and reinforcements;
   at least one electric motor for rotating the at least one rotor;
   a battery, attached to the fuselage, for supplying current to the at least one electric motor; and
   wirings electrically coupling the battery to the at least one electric motor,
   wherein at least a part of the wirings includes rigid conductors,
   wherein at least a part of the at least one coupling structure includes the rigid conductors,
   wherein at least a part of a load on the fuselage from the at least one rotor is received with the rigid conductors, and
   wherein the rigid conductors are load bearing structures that receive the at least the part of the load on the fuselage from the at least one rotor.

2. The electric aircraft according to claim 1, wherein the at least one coupling structure includes:
the panel; and
the reinforcements reinforcing the panel, the reinforcements including the rigid conductors respectively.

3. The electric aircraft according to claim 2, further comprising:
insulating materials each made of a fiber reinforced plastic having an insulating property, the reinforcements being coated with the insulating materials respectively.

4. The electric aircraft according to claim 3, further comprising:
adhesives with which the reinforcements coated with the insulating materials are adhered to the panel,
wherein the panel is made of a carbon fiber reinforced plastic while each of the reinforcements is made of aluminum or copper.

5. The electric aircraft according to claim 2, wherein the at least one coupling structure includes an arm having a hollow interior, of which a first portion is the panel reinforced with the reinforcements and a second portion is a sandwich structure having a core material and panels sandwiching the core material.

6. The electric aircraft according to claim 3, wherein the at least one coupling structure includes an arm having a hollow interior, of which a first portion is the panel reinforced with the reinforcements and a second portion is a sandwich structure having a core material and panels sandwiching the core material.

7. The electric aircraft according to claim 4, wherein the at least one coupling structure includes an arm having a hollow interior, of which a first portion is the panel reinforced with the reinforcements and a second portion is a sandwich structure having a core material and panels sandwiching the core material.

8. The electric aircraft according to claim 1, further comprising a carbon fiber reinforced plastic member disposed on an opposite side of the coupling structure as the rigid conductors.

9. The electric aircraft according to claim 8, wherein, in a cross-sectional view of the at least one coupling structure, the carbon fiber reinforced plastic member and the rigid conductors are not overlapped in a forward-aft direction.

10. The electric aircraft according to claim 1, wherein the rigid conductors are attached to an outside surface of the coupling structure.

11. The electric aircraft according to claim 1, wherein the panel includes a honeycomb sandwich structure on side surfaces without the wiring.

12. The electric aircraft according to claim 1, wherein the panel includes a honeycomb sandwich structure.

13. The electric aircraft according to claim 1, wherein the rigid conductors have cross sectional areas necessary for receiving the at least the part of the load.

14. An electric aircraft comprising:
a fuselage;
at least one rotor;
at least one coupling structure coupling the at least one rotor to the fuselage, the at least one coupling structure including at least one of a panel and reinforcements;
at least one electric motor for rotating the at least one rotor;
a battery, attached to the fuselage, for supplying current to the at least one electric motor; and
wirings electrically coupling the battery to the at least one electric motor,
wherein at least a part of the wirings includes rigid conductors,
wherein the rigid conductors are attached to an outside surface of the coupling structure,
wherein at least a part of a load on the fuselage from the at least one rotor is received with the rigid conductors, and
wherein the rigid conductors are load bearing structures that receive the at least the part of the load on the fuselage from the at least one rotor.

* * * * *